(12) United States Patent
Townshend

(10) Patent No.: US 7,062,441 B1
(45) Date of Patent: Jun. 13, 2006

(54) AUTOMATED LANGUAGE ASSESSMENT USING SPEECH RECOGNITION MODELING

(75) Inventor: Brent Townshend, Menlo Park, CA (US)

(73) Assignee: Ordinate Corporation, Menlo Park, CA (US)

( * ) Notice: Subject to any disclaimer, the term of this patent is extended or adjusted under 35 U.S.C. 154(b) by 0 days.

(21) Appl. No.: 09/311,617

(22) Filed: May 13, 1999

(51) Int. Cl.
*G10L 15/00* (2006.01)

(52) U.S. Cl. .................. 704/270; 704/251; 434/353

(58) Field of Classification Search ............... 704/270, 704/271, 275, 200, 231, 240, 255–257; 434/156–157, 434/185, 350, 353
See application file for complete search history.

(56) References Cited

U.S. PATENT DOCUMENTS

| | | | |
|---|---|---|---|
| 4,468,204 A | | 8/1984 | Scott et al. ............... 434/309 |
| 5,059,127 A | * | 10/1991 | Lewis et al. .............. 434/353 |
| 5,303,327 A | * | 4/1994 | Sturner et al. ............ 704/270 |
| 5,613,041 A | * | 3/1997 | Keeler et al. .............. 706/17 |
| 5,857,173 A | | 1/1999 | Beard et al. .............. 704/276 |
| 5,870,709 A | | 2/1999 | Bernstein ................. 704/275 |
| 6,253,181 B1 | * | 6/2001 | Junqua .................... 704/255 |

FOREIGN PATENT DOCUMENTS

| | | |
|---|---|---|
| WO | WO 94/20952 | 9/1994 |
| WO | WO 98/14934 | 4/1998 |

OTHER PUBLICATIONS

Advance Learning Technologies, 2000. Koun-Ten-Sun, "An effective item selection method for educational measurement". pp. 105-106*

* cited by examiner

*Primary Examiner*—Angela Armstrong
(74) *Attorney, Agent, or Firm*—McDonnell Boehnen Hulbert & Berghoff LLP

(57) ABSTRACT

A system for measuring an ability of a subject. The system includes a set of tasks that require the subject to provide one or more spoken responses. A speech recognition system, which is coupled to receive the spoken responses, provides an estimate of the spoken responses. The estimate may be an estimate of the linguistic content and/or other characteristics of the response. The speech recognition system has an associated operating characteristic relating to its ability to recognize and estimate the content of responses and elements of responses. A scoring device converts the response estimate into one or more item scores. A computation device provides a subject score using a scoring computation model that depends upon the expected item-dependent operating characteristics of the speech recognition system.

15 Claims, 5 Drawing Sheets

The test is presented by computer over the telephone using the Ordinate® testing system.
It tests your ability to speak English and to understand spoken English at a conversational pace.
You will need to read aloud, repeat sentences, answer questions, and build sentences.

Procedure. First, take time to read the whole test paper. If there are words or sentences that you don't understand, you may use a dictionary or ask a friend or a teacher for help. When you are ready to begin the test, use an appropriate telephone to call the telephone number printed on the test paper. When asked, you will enter the Test Identification Number using the buttons on your telephone keypad. You will take the test on your own by following the directions given over the telephone. Relax, concentrate, and do your best. If you do not know how to respond to a test item, just be silent or say *"I don't know."*

Test Sections. The test has five sections (Part A, B, C, D and E) as follows:

Part A: Follow the instructions to read some sentences from among those printed in Part A. Read the sentences in the order requested, which may be different from the order shown. Read aloud as smoothly and naturally as you can.

Part B: Repeat each sentence you hear – exactly as you hear it. Repeat as much of each sentence as you can.

Part C: Answer the questions that are asked with a single word or a short phrase of two or three words.

Part D: You will hear three word groups. Say a reasonable sentence built from these three word groups.

Part E: You will hear each question twice. After you hear a tone, speak your opinion as fully and clearly as you can using the 20 seconds provided until you hear the next tone. Express your opinion and supporting reasons in clear, coherent English. Any opinion is acceptable. Speak for the whole 20 second period.

When you hear: *"Thank you for completing the SET-10 Demo Test,"* the test is complete; you may hang up.

Criteria. SET-10 scores are based on the exact words that you speak, as well as the pace, fluency, and pronunciation of those words as combined in phrases and sentences. Give quick, smooth, loud responses. Note that some test items have more than one correct answer.

Suggestions. Place your call to the Ordinate testing system on a good telephone in a suitable location. Choose a location that is quiet and where you will not be interrupted. At the beginning of your call, the Ordinate testing system will tell you if you are speaking too loudly or too quietly. Hold the phone as shown in the figure below and speak in a loud, steady voice. Use a push-button telephone in good working order that is set to "tone" (not "pulse"). Newer phones are generally better than older phones. Do not use a cordless or cellular phone. If you do not know how to respond to a test item, then remain silent or say *"I don't know."*

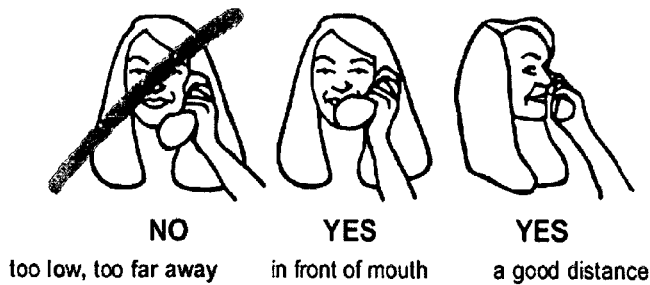

Fig. 2A

Introduction:
*Thank you for calling the Ordinate testing system.*
*Please enter your Test Identification Number on the telephone keypad.*
*Now, please say your name.*
*Now, please follow the instructions for Parts A through E.*

10 {

Part A: Reading. *Please read the sentences as you are instructed.*
1. Traffic is a huge problem in Southern California.
2. The endless city has no coherent mass transit system.
3. Sharing rides was going to be the solution to rush-hour traffic.
4. Most people still want to drive their own cars, though.

5. Larry's next door neighbors are awful.
6. They play loud music all night when he's trying to sleep.
7. If he tells them to stop, they just turn it up louder.
8. He wants to move out of that neighborhood.

9. My aunt recently rescued a dog that was sick.
10. She brought her home and named her Margaret.
11. They weren't sure she was going to live, but now she's healthy.
12. I just wish she could get along better with their cat.

Part B: Repeat. *Please repeat each sentence that you hear.*
Example: a voice says, "Leave town on the next train."
and you say, "Leave town on the next train."

Part C: Questions. *Now, please just give a simple answer to the questions.*
Example: a voice says, "Would you get water from a bottle or a newspaper?"
and you say, "a bottle" or "from a bottle".

Part D: Sentence Builds. *Now, please rearrange the word groups into a sentence.*
Example: a voice says, "was reading"..."my mother"..."her favorite magazine"
and you say "My mother was reading her favorite magazine."

Part E: Open Questions. *You will have 20 seconds to answer each of three questions. The questions will be about family life or personal choices. Each question will be spoken twice, followed by a beep. When you hear the beep, you will have 20 seconds to answer the question. At the end of the 20 seconds, another beep will signal the end of the time you have to answer.*

Fig. 2B

AUTOMATED LANGUAGE ASSESSMENT USING SPEECH RECOGNITION MODELING

COPYRIGHT NOTICE

A portion of the disclosure of this patent document contains material that is subject to copyright protection. The copyright owner has no objection to the facsimile reproduction by anyone of the patent document or the patent disclosure, as it appears in records of the United States Patent and Trademark Office, but otherwise reserves all copyright rights whatsoever.

FIELD OF THE INVENTION

The present invention relates to automated assessment of human abilities. A method and apparatus for automated language assessment are provided. More particularly, a method and apparatus are provided for automated language assessment using speech recognition and a scoring computation model that accounts for the expected accuracy of the speech recognition. In a preferred embodiment, the model is based on Item Response Theory.

BACKGROUND OF THE INVENTION

Interactive language proficiency testing systems using speech recognition are known. For example, U.S. Pat. No. 5,870,709, issued to Ordinate Corporation, describes such a system. In U.S. Pat. No. 5,870,709, the contents of which are incorporated herein by reference, an interactive computer-based system is shown in which spoken responses are elicited from a subject by prompting the subject. The prompts may be, for example, requests for information, a request to read or repeat a word, phrase, sentence, or larger linguistic unit, a request to complete, fill-in, or identify missing elements in graphic or verbal aggregates, or any similar presentation that conventionally serves as a prompt to speak. The system then extracts linguistic content, speaker state, speaker identity, vocal reaction time, rate of speech, fluency, pronunciation skill, native language, and other linguistic, indexical, or paralinguistic information from the incoming speech signal.

The subject's spoken responses may be received at the interactive computer-based system via telephone or other telecommunication or data information network, or directly through a transducer peripheral to the computer system. It is then desirable to evaluate the subject's spoken responses and draw inferences about the subject's abilities or states.

A prior art approach to automatic pronunciation evaluation is discussed in Bernstein et al., "Automatic Evaluation and Training in English Pronunciation," Int'l. Conf. on Spoken Language Processing, Kobe, Japan (1990), the contents of which are incorporated herein by reference. This approach includes evaluating each utterance from subjects who are reading a preselected set of scripts for which training data has been collected from native speakers. In this system, a pronunciation grade may be assigned to a subject performance by comparing the subject's responses to a model of the responses from the native speakers.

One disadvantage of such an evaluation system is that it may not properly weigh the importance of different items with regard to their relevance to the assessment. A further disadvantage to this evaluation technique is that it typically does not account for the accuracy, or more importantly the inaccuracy, of the speech recognition system. Known speech recognition systems may interpret a response incorrectly. For example, speech recognition systems typically are implemented with a predetermined vocabulary. Such a system is likely to react inaccurately to a response that falls outside of the vocabulary. Speech recognition systems also may make errors in recognizing responses to items that are in the vocabulary, particularly short words. As used herein, "recognizing" a response means recognizing the linguistic content and/or other characteristics of the response. The accuracy of the speech recognition system may be thought of as a measure of the character and quantity of errors made by the speech recognition system. It would therefore be desirable to have an improved automated language assessment method and apparatus.

BRIEF DESCRIPTION OF THE DRAWINGS

The preferred embodiments of the present invention are illustrated by way of example, and not limitation, in the figures of the accompanying drawings in which:

FIGS. 2A and 2B illustrate a set of instructions and a set of tasks, respectively, that may be provided to a subject of the system shown in FIG. 1;

BRIEF DESCRIPTION OF THE APPENDICES

The preferred embodiments are further illustrated by way of examples, and not limitation, in the appended pseudo-code segments in which:

Appendix 1 illustrates a software implementation that is capable of reducing an estimate of the words of each response to an item score; and Appendix 2 illustrates a software implementation of a computation of a subject score for the subject by combining item scores using Item Response Theory.

DETAILED DESCRIPTION OF THE PRESENTLY PREFERRED EMBODIMENT(S)

Described herein with reference to the above mentioned figures and appendices, wherein like numerals designate like parts and components, is a method and apparatus for automated language assessment. More particularly, a method and apparatus are provided for automated language assessment using speech recognition and a scoring computation model that accounts, either implicitly or explicitly, for the accuracy of a speech recognition system. As described further below, the preferred embodiments provide the advantage of allowing a subject's ability to be more accurately assessed then would be otherwise possible with an imperfect automatic speech recognition system. In accordance with one preferred embodiment, the scoring computation model is a statistical model based upon Item Response Theory.

Figure 1:
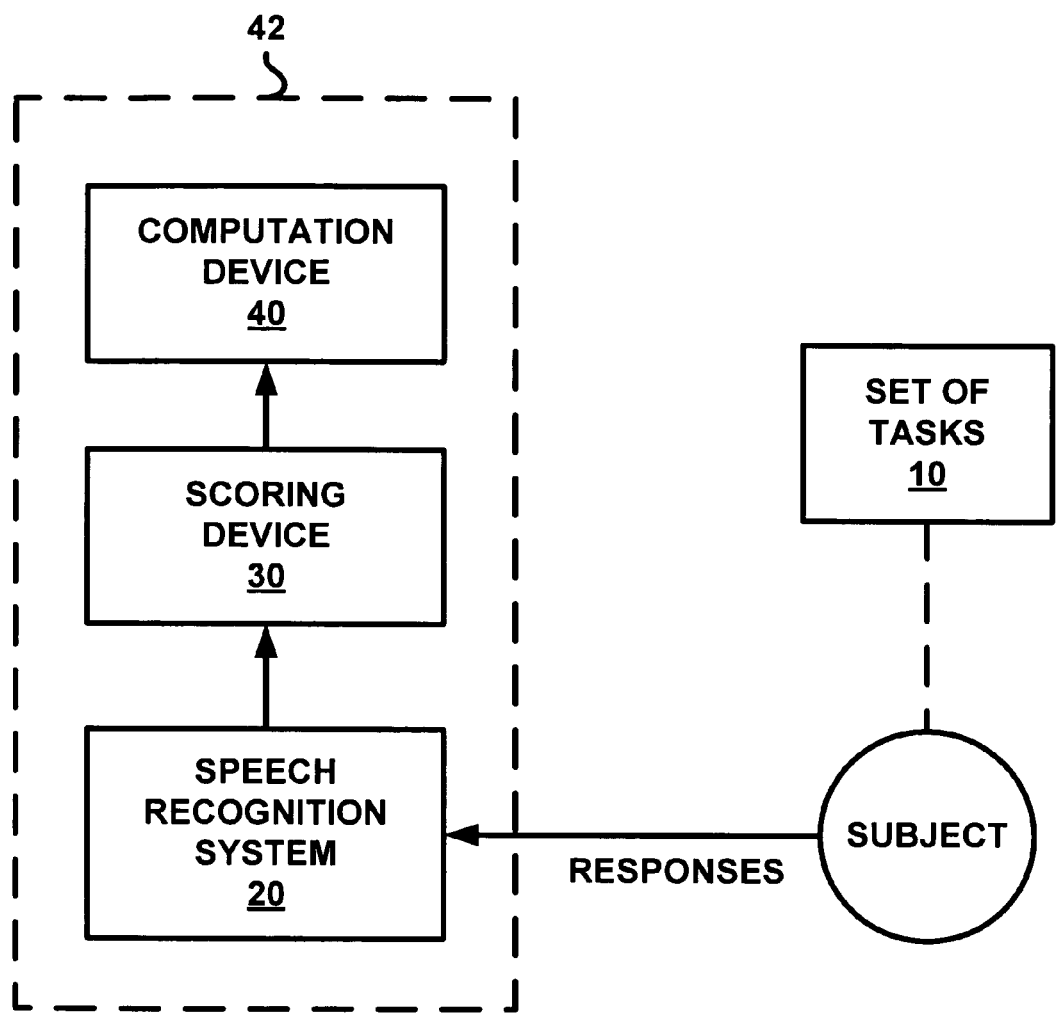
FIG. 1 illustrates a functional diagram of an apparatus for automated language assessment.

FIG. 1 illustrates a functional block diagram of an interactive system for measuring the ability of a subject. The term "subject" may be used herein to refer to an individual who is taking a test, the examinee. For reasons that will become evident below, the term subject, as used herein, shall not mean an individual who provides sample responses to assist in the construction of a scoring computation model.

The interactive system includes a set of tasks 10 that require the subject to provide a spoken response. Either alternatively or in addition to a spoken response, other types of responses may be taken as input to the system. A speech recognition system 20 is coupled to receive the spoken response. The speech recognition system 20 provides an estimate of the words in the spoken response to a scoring device 30, where the estimate is converted into an item score. Either alternatively or in addition to the scoring device 30, other analysis devices may be used as part of the process of reducing subject responses to item scores. Each task in the set of tasks 10 includes one or more items. A computation device 40 receives the item scores for the set of tasks 10 from the scoring device 30. The computation device 40 then provides a subject score b n a combination of the item scores using a scoring computation model that accounts, either implicitly or explicitly, for the accuracy of a speech recognition system 20.

In accordance with a preferred embodiment of the present invention, the scoring computation model is constructed and applied using Item Response Theory. Other techniques may alternatively be utilized, as long as the scoring computation model depends upon the expected item-dependent operating characteristics of the speech recognition system 20. In addition, the set of tasks 10 preferably is provided to the subject in the form of an instruction sheet, verbal instructions, visual instructions and/or any combination of the foregoing. For cases in which the set of tasks 10 is provided to the subject in written form, the set of tasks 10 may be printed in the form of a booklet or brochure, for example. Alternatively, the set of tasks 10 may be presented to the subject on a monitor, video display or the like. The subject preferably communicates his or her responses via a telephone, although a microphone or other voice transducer may alternatively be used.

The speech recognition system 20 may be a commercially available software product that is run on a general purpose computing platform 42. For example, the speech recognition system 20 may be the Entropic HTK software product, which is available from Entropic, Inc., located in the Washington, D.C. and Cambridge, United Kingdom. The Entropic HTK software running on the general purpose computing platform provides an interactive computer-based system, which the subject may access by peripheral transducer, or by telephone or other telecommunication or data information network using known communication techniques. Like the speech recognition system 20, the scoring device 30 and the computation device 40 are preferably functional modules, as further described below, associated with the general purpose computing platform.

FIGS. 2A and 2B illustrate a for a subject and a set of tasks that require the subject to provide spoken responses, respectively. The set of tasks shown in FIG. 2B is designed to measure facility in spoken English or other aspects of oral language proficiency. A test is administered over a telephone connection by an interactive system, such as the system shown in FIG. 1. FIG. 2A sets forth the test instructions, while FIG. 2B sets forth the test structure and example questions.

For this embodiment, the subject dials into the interactive system using a predetermined telephone number in order to take the test. Once a connection is established, the interactive system provides directions to the subject over the telephone connection and the subject provides responses. For the embodiments shown in FIGS. 2A and 2B, the set of tasks has five sections and corresponding instructions are provided. In part A of the set, the subject will be instructed to read selected sentences from among those printed in part A of FIG. 2B. In part B, the subject will be instructed to repeat sentences played by the interactive system. In part C, the subject is instructed to say the opposite word for a word provided by the interactive system. In part D, the interactive system generates a series of questions and the subject responds with a single word or a short phrase. Finally, in part E, the subject will be asked two essay-type questions and will be asked to respond within a predetermined period of time, such as 30 seconds.

The set of tasks shown in FIGS. 2A and 2B is designed for English language learners with at least basic reading skills. Alternative sets of tasks may be devised by those skilled in the art after reviewing this patent specification. For example, other languages or skill levels may be tested by providing an alternative set of tasks 10. For the illustrations shown in FIGS. 2A and 2B, every item requires the subject to understand a spoken utterance and to speak in response to it. Alternative tests may be devised for testing the ability of the subject to comprehend written or graphically displayed items. These and other alternatives are expressly intended to fall within the scope of the present invention as long as at least a portion of the test requires the subject to provide a spoken response.

The subject's language skills are then assessed by the interactive system based on the exact words used in spoken responses and a scoring computation model relating to the set of tasks 10. The system may also consider the latency, pace, fluency, and pronunciation of the words in phrases and sentences.

The scoring computation model may be constructed in numerous ways. Nonetheless, in accordance with a preferred embodiment of the present invention, the scoring computation model is constructed as follows.

Sets of task items are presented to appropriate samples of native and non-native speakers and the responses of these sample speakers to these task items are recorded and analyzed by speech processing and recognition and/or by human transcription and linguistic description.

Native speaker samples include individuals selected with reference to the range and incidence of demographic, linguistic, physical or social variables that can have a salient effect on the form or content of the speech as received at the speech recognition system. These demographic, linguistic, physical or social variables include a speaker's age, size, gender, sensory acuity, race, dialect, education, geographic origin or current location, employment, or professional training. Speech samples are also selected according to the time of day at the individual's location, the type and condition of the signal transducer, and the type and operation of the communication channel. Native response samples are used in the development of the scoring computation model to define or verify the linguistic and extra-linguistic content that is expected or that is scored as correct, and to quantify and ensure equity in test scoring.

Non-native speaker samples include individuals selected with reference to the range and incidence of demographic, linguistic, physical or social variables that can have a salient effect on the form or content of the speech as received at the speech recognition system. For the non-native speakers, these demographic, linguistic, physical or social variables include the identities of a speaker's first, second, or other languages, level of skills in the target language of the test or any other language or dialect, the age, size, gender, race, dialect, education, geographic origin or current location, employment, or professional training. Speech samples are also selected according to the time of day at the individual's location, the type and condition of the signal transducer, and the type and operation of the communication channel. Non-native response samples are used in the development of the scoring computation model to define or verify the linguistic and extra-linguistic content of the responses that is expected or that is scored as correct, to define or calibrate the range of scoring, and to quantify and ensure equity in test scoring.

In accordance with this embodiment, the scoring computation model is therefore constructed based upon the responses of the sample speakers. Statistical analysis of the responses of the sample speakers allows a scoring computation model to be constructed that accounts for inaccuracies in the automated speech recognition system 20. In addition, the responses of the sample speakers may be used to generate a difficulty value for each item in the set of task items. By applying a statistical model, such as one of those consistent with Item Response Theory for example, to the responses of the sample speakers, the measure of item difficulty may implicitly take into account the inaccuracy of the speech recognition system 20 as well as the subjects' difficulty with the given item. Preferably, the information regarding item difficulty is included in the scoring computation model.

Figure 3:
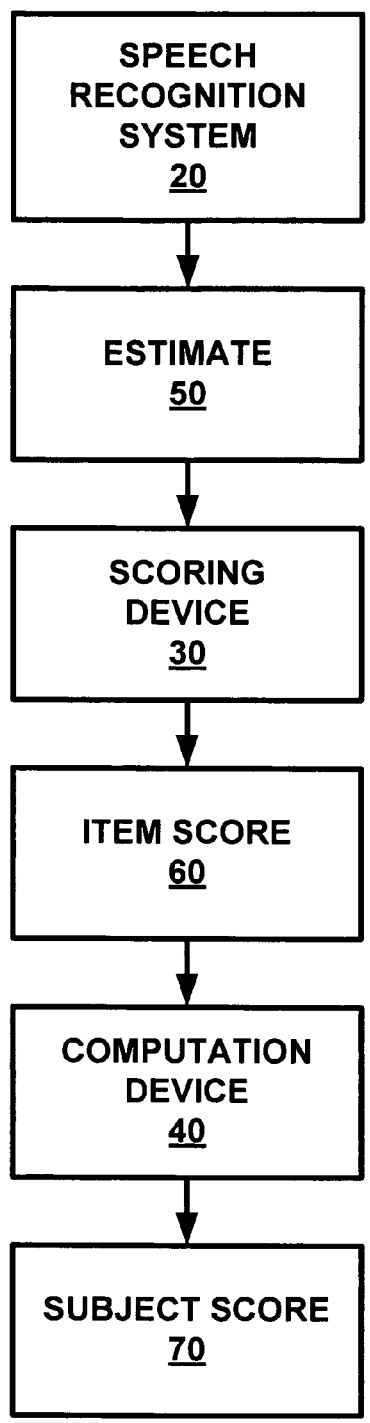
FIG. 3 illustrates a speech recognition system that may be used in the apparatus shown in FIG. 1.

Returning again to an automated assessment of the subject's language skills, the subject's spoken responses are digitized and passed to the interactive grading system 42. FIG. 3 is functional block diagram of this portion of the grading system. The functional elements of the interactive system include the speech recognition system 20, the scoring device 30, and the computation device 40. As noted above, the speech recognition system 20 may be a commercially available system, such as the Entropic HTK system. The scoring device 30 and the computation device 40 may be implemented in software. Pseudo-code implementations for the scoring device and the computation device are provided in Appendix 1 and Appendix 2 hereto, respectively.

The speech recognition system 20 receives the spoken response from the subject and provides to the scoring device 30 an estimate 50 of the words in the spoken response. The scoring device 30 converts the estimate 50 into an item score 60. An item is a single task to be performed by the subject, calling for a word, phrase or sentence response. The computation device 40 provides a subject score 70 based on a combination of item scores using a scoring computation model that depends upon the expected item-dependent operating characteristics of the speech recognition system 20, such as the scoring computation model described above. In accordance with a preferred embodiment, the scoring computation model is consistent with Item Response Theory.

A pseudo-code implementation of the scoring device 30 is provided in Appendix 1 hereto. For this embodiment, the scoring device 30 converts the estimate into an item score by counting the number of insertions, deletions and substitutions needed to convert the spoken response into one of the correct responses.

The purpose of the scoring device module 30 is to compare two phrases and compute how many differences there are between the two at the word level. The total number of differences is the smallest number of insertions, substitutions, and deletions of words required to transform the first phrase into the second phrase. This total number of differences may also be referred to herein as the "item score." Note, however, that in accordance with a preferred embodiment, insertions of words at the beginning or end of the phrase may not be counted. For example, the number of word differences between:

"Ralph was a small mouse"

and "well Ralph was was a house"

may be computed as follows:
  Insertion of "well"—not counted (leading insertion)
  Insertion of second "was"—1 insertion
  Deletion of "small"—1 deletion
  Substitution of "house" for "mouse"—1 substitution for a total of 3 differences.

For any given pair of phrases, there are multiple sets of transformations that are possible. For example, in the above, we could have interpreted the transformations as a deletion of "mouse" and an insertion of "house" rather than a substitution of "house" for "mouse". However, the scoring device, as implemented in Appendix 1 hereto, returns a set of transformations that give the smallest total number of differences. Thus, the substitution alternative would have been chosen over the deletion/insertion alternative. The count of errors (3 for the example item set forth above) may then be weighted on an item-by-item basis by the computation device, as described below.

For purposes of efficiency, the first step in the scoring device module 30 set forth in Appendix 1 hereto is to convert the list of words in each phrase into a list of integers, where each integer represents a single word. This conversion is performed by "PhraseToWordHash( )." An advantage to doing this is that it is faster to compare two integers than comparing each letter of two words.

It is to be understood that an item score may be computed in any other way without departing from the present invention. The DiffCount( ) procedure described in Appendix 1 hereto is an example of one way in which the item score may be obtained. For purposes of the preferred embodiments described herein, the item score may be thought of as any measure or set of measures derived from a subject's response to a single item. Alternative approaches for obtaining an item score are well within the capabilities of those skilled in the art. For example, an item score may be obtained by determining whether the response as a whole is correct or incorrect, i.e. no errors (score is 0) versus any number of errors (score is 1), or whether the spoken response includes, as a portion thereof, the correct response. An item score may also include non-numeric elements such as words, phrases or structural descriptions that are estimated by analysis of item responses.

A pseudo-code implementation of the computation device 40 is provided in Appendix 2 hereto. As noted above, the computation device 40 provides a subject score 70, which is indicative of aspects of the subject's language proficiency. In accordance with a preferred embodiment of the present invention as described in Appendix 2 hereto, the subject score 70 is based on a combination of a series of item scores 60 using Item Response Theory.

Item Response Theory provides one approach by which the contribution of item scores on individual items to an underlying measure can be established. Specifically, it provides a tool by which the difficulties of items can be mapped onto linear scales in a consistent way. The application of Item Response Theory analysis to an exam scored by automatic speech recognition provides the advantage of combining not only the difficulty the examinee is expected to experience on a given item, but also the difficulty that the automatic speech recognition system 20 is expected to have in correctly recognizing the response, or any part thereof. As a result, the individual's ability is more accurately assessed than would otherwise be possible with an imperfect automatic speech recognition system. Further details on Item Response Theory may be found in "Introduction to Classical and Modern Test Theory", authored by Linda Crocker and James Algina, Harcourt Brace Jovanovich College Publishers (1986), Chapter 15 and "Best Test Design; Rasch Measurement", by Benjamin D. Wright and Mark H. Stone, Mesa Press, Chicago, Ill. (1979), the contents of both of which are incorporated herein by reference.

Once a subject's responses have been graded on an item level, for example each response has been graded as right or wrong, or the number of errors in each response has been determined, then the item scores 60 need to be combined into a subject score 70 for the individual. One way of doing this is to simply total the item scores 60 to give a total number correct or a total number of errors. However, this does not capture the differing difficulty among the items, nor does it capture the item-dependent operating characteristics of the speech recognition system 20. A subject who received more difficult items (or items that are poorly recognized) would end up with a lower subject score 70 than another subject of equal ability who received, by chance, easier items. A better way of combining the item scores 60 is to use a scoring computation model that depends upon the expected item-dependent operating characteristics of the speech recognition system 20 and the item difficulty, such as a scoring computation model based on Item Response Theory. In particular, the computation device 40 imposes a statistical model on the subject's responses and comes up with a "best" estimate of the subject's ability given the items and the pattern of the responses.

As well as properly handling the difficulties of the items given to the subject, this approach offers another important advantage with respect to speech proficiency testing. Because speech recognition systems, such as the speech recognition system 20 in FIGS. 1 and 3, may be imperfect, items will at times be incorrectly graded (i.e. incorrect responses may be graded as correct or vice versa). The error behavior of the speech recognition system 20 is item dependent—different items exhibit different recognizer error patterns. By applying the scoring computation model to the item scores 60, the computation device 40 implicitly captures and accounts for this error. In accordance with this embodiment, items that are often misrecognized by the speech recognition system 20, which make it appear that the subject committed more errors than the subject actually did, end up being assigned a high difficulty value. The result of this is that the items that are misrecognized do not penalize the subject as severely in terms of subject score 70. Items that are more accurately recognized by the speech recognition system 20 affect the examinee's subject score 70 more significantly. Thus, the statistical operations associated with the application of scoring computation model to the item scores 60 serve to de-emphasize the effects of speech recognizer errors.

The computation device 40 module, as set forth in Appendix 2 hereto, applies a scoring computation model to a set of item scores 60 to compute an ability measure along with a confidence interval for that measure. As input, the RaschMeasure( ) routine takes a set of non-negative integers indicating the item scores for a particular set of items. Also input is an array of item difficulties that are used in the Item Response Theory computation.

The RaschMeasure( ) routine then uses these inputs to estimate the ability of the test-taker using the Rasch model from Item Response Theory (which is well known to those skilled in the art). It does this by computing the likelihood of the given set of responses for a range of assumed values for the caller ability (in accordance with one embodiment, the range is fixed from −8.0 to +8.0 in steps of 0.01). Other ranges and step sizes may alternatively be used. These likelihoods are then normalized to give a probability density (PDF) for the subject's ability. The expected value of the subject's ability can then be computed by integrating under the PDF. This is the value returned. The confidence interval is defined as the 0.1 and 0.9 points on the cumulative density function (the integral of the PDF), and these two values are also returned.

The computation device 40 may alternatively apply statistical combination techniques other than the RaschMeasure( ) routine. For example, the UCON model, the PAIR model, and the PROX model, all of which are well known techniques for applying Item Response Theory, may be used. Other statistical techniques may also be used, such as using an explicit measure of speech recognition accuracy to weight the item scores.

The subject score 70, in which the item scores 60 are combined using a scoring computation model that depends upon the expected item-dependent operating characteristics of the speech recognition system 20, provides a better measure of the subject's ability than does the item score 60. In particular, the subject score 70 includes item scores 60 that are properly weighted with regard to both the item's relevance to the assessment and to the accuracy with which the speech recognition system operates on the item or its elements. Using Item Response Theory, for example, the difficulty of the items can be mapped onto a linear scale in a consistent way. By normalizing the problem of the speech recognition system 20 incorrectly recognizing the items in the subject's response, the subject's ability can be more accurately assessed. Furthermore, the Item Response Theory methods assume the underlying parametric model and derive from the data the single most representative dimension to explain the observed item scores 60 by including the expected characteristics of both the subject performance and the speech recognition performance.

As described above, the scoring computation model operates on an item-by-item basis. In accordance with a further alternative embodiment of the present invention, the scoring computation model is even more finely tuned to operate on elements of the response to an item. For example, an item may be, "Repeat the sentence 'Ralph went to the store.'" One subject responds, "Ralph went the store." A second subject responds, "Ralph went to the." If the item score is determined by counting deletions, as described above with reference to Appendix 1, then both subjects would receive an item score of one error for this item. The word deleted by the first subject can be said to have been weighted equally to the word deleted by the second subject. In accordance with the alternative embodiment, however, the elements within the item may be weighted differently. For the example above, the deletion of "store" by the second subject would be scored differently, or weighted more heavily, than the deletion of "to" by the first subject. This may be particularly appropriate in situations where the speech recognition system 20 has difficulty recognizing short words, such as the word "to."

Figure 4:
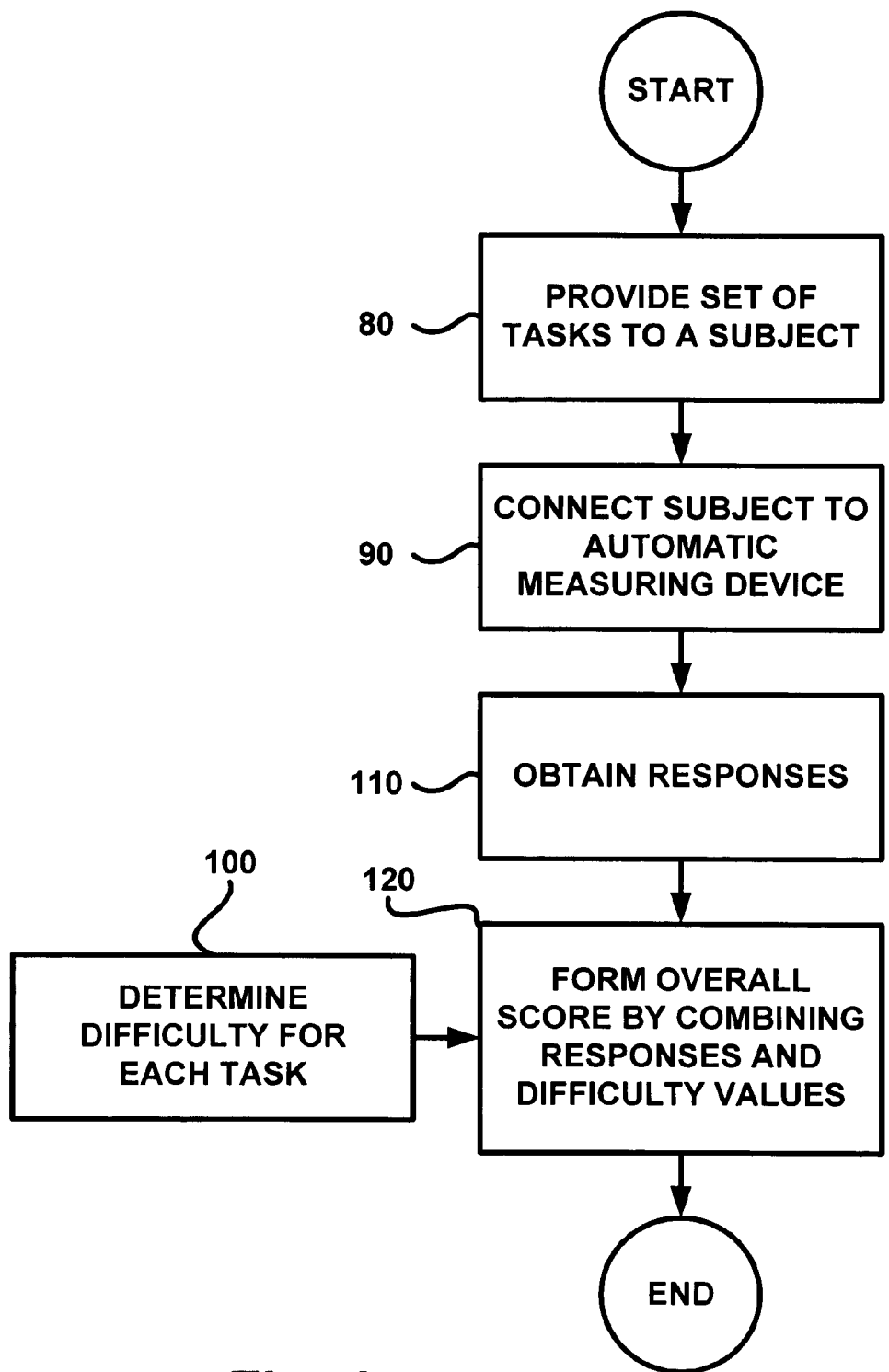
FIG. 4 is a flow chart illustrating a method for measuring an ability of a subject in accordance with a preferred embodiment of the present invention.

FIG. 4 is a flow chart illustrating a method for measuring an ability of a subject in accordance with a preferred embodiment of the present invention. At step 80, a set of tasks is provided to a subject, and at step 90 a device that automatically measures performance of the tasks is connected to the subject. A difficulty value was previously determined for each task item at step 100. In accordance with a preferred embodiment of the present invention, the difficulty value is based upon both the task item and upon a performance measure associated with an ability of the automated device to accurately assess performance of the task. For this embodiment, the automated device is the speech recognition system 20, as shown in FIGS. 1 and 3 for example. At step 110, verbal responses to the tasks are obtained from the subject. Step 100 is typically performed in advance of steps 80, 90, 110, and 120, such as by collecting sample response from native and non-native speakers as described above. The verbal responses and the difficulty values are combined at step 120 to form a subject score 70.

The present embodiments preferably encompass logic to implement the described methods in software modules as a set of computer executable software instructions. A Central Processing Unit ("CPU") or general purpose microprocessor implements the logic that controls the operation of the interactive system. The microprocessor executes software that can be programmed by those of skill in the art to provide the described functionality. The software can be represented as a sequence of binary bits maintained on a computer readable medium including magnetic disks, optical disks, organic disks, and any other volatile or (e.g., Random Access memory ("RAM")) non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the unit's operation. The executable software code may implement, for example, the methods described above.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used than are shown in the block diagrams.

It should be understood that a hardware embodiment may take a variety of different forms. The hardware may be implemented as a digital signal processor or general purpose microprocessor with associated memory and bus structures, an integrated circuit with custom gate arrays or an application specific integrated circuit ("ASIC"). Of course, the embodiment may also be implemented with discrete hardware components and circuitry.

The claims should not be read as limited to the described order of elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

APPENDIX 1

```
#include <iostream.h>
#include "DiffCount.H"
#include "log.h"
static int PhraseToWordHash(const char *p, int *w, int maxwords)
{
    int n=0;
    w[n]=0;
    for (;*p;p++) {
        while (w[n]==0 && (*p == '%' || (*p=='u' && p[1]=='h' &&
                                        (p[2]=='_'||p[2]==' '|p[2]==0)))) {
            // Skip to next word
            while (*p && *p!=' ')
                p++;
            while (*p && *p==' ')
                p++;
        }
        if (*p == '_') {
            // Skip suffix with word number
            while (*p && *p!=' ')
                p++;
        }
        if (*p == ' ') {
            while (*p && *p==' ')
                p++;
            p--;
            n++;
            if   (n>= maxwords) {
                logmsg(LOG_ERR, "Too many words in phrase %s",p);
                return n;
            }
            w[n]=0;
            continue;
        }
        if (*p == 0)
            break;
        w[n]=(w[n]<<6)^((int)*p)^((w[n]>>31)&1)^((w[n]>>17)&1);
    }
    if (w[n])
        n++;
    return n;
```

APPENDIX 1-continued

```
}
static char blanks[ ]="
                     ";
static int nblanks=sizeof(blanks)-1;
static const char *gp1=0;
static const char *gp2=0;
static int *gw1;
static int *gw2;
const int Diffs::SUBWT=1;
const int Diffs::INSWT=1;
const int Diffs::DELWT=1;
const int Diffs::LDINSWT=0;
const int Diffs::TRINSWT=0;
ostream& operator<<(ostream& s, const Diffs &d)
{
    s << "[" << d.Score( ) << "]"
        << "I=" << d.ldins << "/" << d.nins << "/" << d.trins << ", D=" <<d.ndel\
    << ", S=" << d.nsub;
    return s;
}
// Return number of ins/del/subs needed to convert w1 to w2
static void Match(const int *w1,int n1,const int *w2,int n2,int maxdiff,Diffs &\
d, int athead,
            int attail,int depth)
{
    Diffs d2;
    int i;
    int w1appears=0;
    int w2appears=0;
#ifdef TEST
    cout << &blanks(nblanks-depth] << "Match(";
    const char *p = gp1;
    for (i=0;w1-gw1>i;p++) {
       if (*p == ' ')
          i++;
    }
    for (i=0;*p&&i<n1;) {
      cout << *p;
      p++;
      if (*p == ' ')
         i++;
    }
    cout << ",";
    p=gp2;
    for (i=0;w2-gw2>i;p++) {
       if (*p == ' ')
          i++;
    }
    for (i=0;*p&&i<n2;) {
      cout << *p;
      p++;
      if (*p ==' ')
          i++;
    }
    cout << "," << (athead? "H":" ") << (attail ?"T":" ") << "," <<maxdiff << ")\
" << endl;
#endif
    d.Clear( );
    if (n1 > n2) {
       d.ndel=n1-n2;
       d.nsub=n2;
    } else {
       if (athead)
          d.ldins=n2-n1;
       else if (attail)
          d.trins=n2-n1;
       else
          d.nins=n2-n1;
       d.nsub=n1;
    }
    if (maxdiff<=0)
       goto done;
    if (athead && *w1==*w2 && n1>0 && n2>0) {
       // Break the athead status to grab a match
       Match(w1+1,n1-1,w2+1,n2-1,maxdiff,d2,0,attail,depth+1);
       if (d2.Score( ) < d.Score( ))
          d=d2;
    }
    if (attail && w1[n1-1]==w2[n2-1] && n1>0 && n2>0) {
```

APPENDIX 1-continued

```
    // Break the attail status to grab a match
    Match(w1,n1-1,w2,n2-1,maxdiff,d2,athead,0,depth+1);
    if (d2.Score( ) < d.Score( ))
        d=d2;
}
if (athead == 0) {
    // For the rest, follow any matches we can get
    while (n1>0 && n2>0 && *w1==*w2) {
        n1--;w1++;
        n2--;w2++;
    }
}
if (attail == 0) {
    // For the rest, follow any matches we can get
    while (n1>0 && n2>0 && w1[n1-1]==w2[n2-1]) {
        n1--;
        n2--;
    }
}
if (n1 == 0 || n2 == 0) {
    d.Clear( );
    if (n1==0) {
        if (athead)
            d.ldins=n2;
        else if (attail)
            d.trins=n2;
        else
            d.nins=n2;
    } else
        d.ndel=n1;
    goto done;
}
for (i=1;i<n2;i++)
    if (*w1 == w2[i]) {
        w1appears=1;
        break;
    }
for (i=1;i<n1;i++)
    if (*w2 == w1[i]) {
        w2appears=1;
        break;
    }
if (d.Score( ) < maxdiff)
    maxdiff=d.Score( );
// Insertion in w2
if (w1appears) {
    Match(w1,n1,w2+1,n2-1,maxdiff-(athead?Diffs::LDINSWT:Diffs::INSWT),d2,a\
thead,attail,depth+1);
    if (athead)
        d2.ldins++;
    else
        d2.nins++;
    if (d2.Score( ) < d.Score( )) {
        d=d2;
        if (d.Score( ) < maxdiff)
            maxdiff=d.Score( );
    }
}
// Deletion
if (w2appears) {
    Match(w1+1,n1-1,w2,n2,maxdiff-Diffs::DELWT,d2,athead,attail,depth+1);
    d2.ndel++;
    if (d2.Score( ) < d.Score( )) {
        d=d2;
        if (d.Score( ) < maxdiff)
            maxdiff=d.Score( ));
    }
}
// Substitution
if (n1 == 1 && n2 == 1) {
    d2.Clear( );
    d2.nsub=1;
} else {
    Match(w1+1,n1-1,w2+1,n2-1,maxdiff-Diffs::SUBWT,d2,athead,attail,depth+1\
);
    d2.nsub++;
}
if (d2.Score( ) < d.Score( ))
    d=d2;
```

APPENDIX 1-continued

```
    done:
#ifdef TEST
    cout<< &blanks[nblanks-depth] << "->" << d << endl;
#endif
    return;
}
// Count the difference between two phrases in terms of deletions,insertions,su\
bs
int DiffCount(const char *p1, const char *p2, Diffs &best)
{
    int w1[100];
    int w2[100];
    qp1=p1;
    gp2=p2;
    gw1=w1;
    gw2=w2;
    // Convert phrases to word hashes
    int n1=PhraseToWordHash(p1,w1,100);
    int n2=PhraseToWordHash(p2,w2,100);
#ifdef TEST
    cout << "w1=[";
    int i;
    for (i=0;i<n1;i++)
        cout << w1[i] << " ";
    cout << "]" << endl;
    cout << "w2=[";
    for (i=0;i<n2;i++)
        cout << w2[i] << " ";
    cout << "]" << endl;
#endif
    // Find best match
    Diffs worst;
    if (n1<n2) {
        worst.ldins=n2-n1;
        worst.nsub=n1;
    } else {
        worst.ndel=n1-n2;
        worst.nsub=n2;
    }
#ifdef TEST
    cout << "Worst=" << worst << endl;
#endif
    Match(w1,n1,w2,n2,worst.Score( ),best,1,1,0);
#ifdef TEST
    cout << "Best=" << best << endl;
#endif
    return best.Score( );
}
#ifdef TEST
#include <stdio.h>
main(int argc, char *argv[ ])
{
    Diffs d;
    (void)DiffCount(argv[1],argv[2],d);
    cout << "Diff('" << argv[1] << "','" << argv[2] << "') -> " << d << endl;
}
endif
```

APPENDIX 2

```
#include <iostream.h>
#include <math.h>
#include "dbg.H"
#include "Rasch.H"
static inline double RaschProb(double alpha)
{
    double ealpha=exp(alpha);
    return ealpha/(1+ealpha);
}
// Compute Rasch measure of proficiency using the 'nresp' observations of
// given difficulties and categorizations.
// Category is 0..nsteps
// Steps[i] is the step calibration for going from category i to i+1
void RaschMeasure(int nresp, const Array<ItemDifficulty> &id,
                  const int *category, float *value, float *cimin, float *cimax)
{
```

APPENDIX 2-continued

```
    dbg("RaschMeasure",3) << "RaschMeasure with " << nresp << "items." << endl;
    const float CI = (float)0.1; /* 80% balanced confidence interval */
    const float minscore = (float)-8.0;
    const float maxscore = (float)8.0;
    const float scorestep = (float).01;
    const int nscoresteps=(int) ((maxscore-minscore)/scorestep+1);
    /* Do numerical computation of PDF */
    float *pdf = new float[nscoresteps];
    int j=0;
    double ptotal=0.0;
    double wtsum=0.0;
    double s;
    double mles=0;
    double mlep=0;
    double *pk = new double[100];
    for (s=minscore;j<nscoresteps;s+=scorestep,j++) {
        double p=1;
        for (int i=0;i<nresp;i++) {
            int k;
            /*        assert(category[i]<id[i].steps.Size( )); */
            for [k=0;k<id[i].steps.Size( );k++)
                pk[k]=1;
            for [int j=1;j<id[i].steps.Size( );j++) {
                double rp=exp(s-id[i].difficulty-id[i].steps[j].stepcal);
                for (k=j;k<id[i].steps.Size( );k++)
                    pk[k] *= rp;
            }
            double psum=0;
            for (k=0;k<id[i].steps.Size( );k++)
                psum+=pk[k];
            int jmatch=id[i].steps.Size( )-1;
            for (j=1;j<id[i].steps.Size( );j++)
                if (id[i].steps[j].step > category[i]) {
                    jmatch=j-1;
                    break;
                }
            if (s==minscore)
                dbg("RaschMeasure",4)   <<"Resp " << i << "\t" << id[i].difficulty << \
"\t"
                                        << category[i] << "\tStep Index: " << jmatch <<\
"\t"
                                        << "p: " << pk[jmatch]/psum << endl;
            p*=pk[jmatch]/psum;
        }
        ptotal+=p;
        wtsum+=p*s;
        pdf[j]=(float)p;
        if (p > mlep) {
            mlep=p;
            mles=s;
        }
    }
    delete pk;
    *value = (float) (wtsum/ptotal);
    double psum=0;
    for (j=0;<nscoresteps&&psum<CI*ptotal;j++)
        psum+=pdf[j];
    *cimin=minscore+j*scorestep;
    psum=0;
    for (j=nscoresteps-1;j>=0&&psum<CI*ptotal;j--)
        psum+=pdf[j];
    *cimax=minscore+j*scorestep;
    dbg("RaschMeasure",3] << "result=" << *value << "[" << *cimin << ","
        << *cimax << "]" << ", MLE=" << mles << endl;
    delete [ ] pdf;
    return;
}
#ifdef TEST
void main( )
{
    SetDebug("10");
    /* Test call 27, group 3 results */
#if 0
    float itemdiff[ ]=(3.59,.62,.29,-1.59,-1.89,1.98,.67,1.09,-.37,-1.16);
    int category[ ]={1,1,0,1,1,1,1,1,1,1};
#else
    float itemdiff[ ]=(3.59,.62,.29,1.09,-1.16,.63,-1.74,-.67,-.34,-1.64);
    int category[ ]={0,0,0,1,0,0,1,1,1,1};
#endif
```

APPENDIX 2-continued

```
    float val,cimin,cimax;
    float steps[1] = {0.0};
    RaschMeasure(sizeof(itemdiff)/sizeof(itemdiff[0]),itemdiff,
        1,steps,
        category,&val,&cimin,&cimax);
    printf("%.1f (%.1f:%.1f)\n",val,cimin,cimax);
}
endif
```

I claim:

1. A system for measuring an ability of a subject, comprising:
a first set of task items that require the subject to provide one or more spoken responses;
a speech recognition system coupled to receive the spoken response and to provide an estimate of the spoken response, the speech recognition system having an associated non-random inaccuracy;
a scoring device, the scoring device being operable to convert the estimate into a task item score; and
a computation device, the computation device providing a subject score based on a combination of task item scores using a scoring computation model that depends upon an expected task item-dependent operating characteristic of the speech recognition system, including the associated non-random inaccuracy of the speech recognition system.

2. A system as claimed in claim 1, wherein the scoring computation model is based on Item Response Theory.

3. A system as claimed in claim 1, wherein the speech recognition system, the scoring device and the computation device comprise software modules running on a general purpose computing platform.

4. A system as claimed in claim 1, wherein the scoring computation model is constructed from a plurality of responses provided by a number of native and non-native speakers, the plurality of responses being prompted by a second set of task items.

5. A system as claimed in claim 1, wherein the estimate provided by the speech recognition system comprises an estimate of the linguistic content of the spoken response.

6. A system as claimed in claim 1, wherein at least one task item in the first set of task items is a task item selected from the group consisting of a prompt to read a sentence aloud, a prompt to repeat a word, a prompt to repeat a phrase, to repeat a sentence, a prompt to provide an opposite, and a prompt to answer a question.

7. In a computer-based system that grades spoken responses to a set of task items, wherein the system comprises a speech recognition system, an improved method of grading the spoken responses, the improvement comprising:
determining a subject score for the spoken responses to the set of task items, wherein the subject score accounts for a task item-dependent operating characteristic of the speech recognition system to accurately recognize the spoken responses.

8. A method for measuring an ability of a subject, comprising:
providing a set of task items;
generating a difficulty value for each task item in the set, the difficulty value being based upon the task item and a performance measurement associated with an automatic device that measures task performance, wherein the performance measurement comprises a measure of a task item-dependent operating characteristic of the automatic device from responses to the set of tasks;
obtaining a response to each task item from the subject; and
combining the difficulty values and the responses from the subject to form a subject score reflecting at least one of a linguistic ability and a cognitive ability of the subject.

9. A method as claimed in claim 8, wherein the step of combining the difficulty values and the responses comprises the step of applying a statistical model to the plurality of responses.

10. A method as claimed in claim 8, wherein the step of generating a difficulty value comprises the step of obtaining a plurality of sample responses from a group of sample speakers.

11. A method as claimed in claim 10, wherein the step of generating a difficulty value further comprises the step of applying a statistical model to the plurality of sample responses.

12. An apparatus for determining a difficulty value of task items in a test, comprising:
a set of responses to the task items from a number of individuals;
an automated grader, wherein the automatic grader receives the set of responses and provides graded responses; and
means for reducing the graded responses to a set of task item difficulties, said task item difficulties normalizing the task items by accounting for non-random errors by the automatic grader.

13. A method for determining a difficulty value of task items in a text, comprising:
obtaining a set of responses to the task items from a number of individuals;
automatically grading the set of responses, thereby generating graded responses; and
reducing the graded responses to a set of task item difficulties, said task item difficulties including a measurement of a task item-dependent operating characteristic associated with the act of automatically grading the set of responses for purposes of normalizing the task items to provide an accurate assessment.

14. A method for measuring an ability of a subject comprising:
providing a set of task items and a device that automatically measures performance of the task items;
determining a difficulty value for each task item, wherein the difficulty value is based upon the task item and upon a performance measure associated with a task item-dependent operating characteristic of an automated device in assessing performance of the task;

obtaining verbal responses to the task items from the subject; and combining the verbal responses and the difficulty values to form a subject score reflecting at least one of a linguistic ability and a cognitive ability of the subject.

15. A method as claimed in claim 14, wherein the device comprises an automated speech recognition system.

* * * * *